United States Patent [19]

Hamisch, Jr.

[11] 4,116,746

[45] Sep. 26, 1978

[54] HAND-HELD LABELER

[75] Inventor: Paul H. Hamisch, Jr., Franklin, Ohio

[73] Assignee: Monarch Marking Systems, Inc., Dayton, Ohio

[21] Appl. No.: 775,010

[22] Filed: Mar. 7, 1977

[51] Int. Cl.[2] .............................................. B32B 35/00

[52] U.S. Cl. .................................... 156/384; 156/541; 156/577; 156/579; 156/584

[58] Field of Search ............... 156/384, 541, 542, 574, 156/577, 579, 582, 584, DIG. 5, DIG. 9, DIG. 19, DIG. 37, DIG. 39, DIG. 40, DIG. 41, DIG. 42, DIG. 48, DIG. 49; 29/110, 110.5, 116 R, 116 AD, 124, 125, 129.5, 130

[56] References Cited

U.S. PATENT DOCUMENTS

| | | | |
|---|---|---|---|
| 1,162,700 | 11/1915 | Lamoureux | 156/384 |
| 3,522,643 | 8/1970 | Winkler | 29/130 |
| 3,678,846 | 7/1972 | Bjorkegren | 29/129.5 |
| 3,717,899 | 2/1973 | Gardner et al. | 156/579 |
| 3,750,246 | 8/1973 | Pessen | 29/116 AD |
| 3,798,106 | 3/1974 | Jenkins et al. | 156/384 |

*Primary Examiner*—Caleb Weston
*Attorney, Agent, or Firm*—Joseph J. Grass

[57] ABSTRACT

There is disclosed a hand-held labeler having an improved applicator roll and roll-mounting structure and an improved labeling method. The applicator roll is mounted for both rolling and canting movement relative to the frame of the labeler so that the applicator roll will accommodate the surface to which the label is to be applied.

17 Claims, 6 Drawing Figures

HAND-HELD LABELER

BACKGROUND OF THE INVENTION

1. Field of the Invention

This invention relates to the art of labelers and to method of labeling.

2. Brief Description of the Prior Art

Prior art labelers with applicator rolls are disclosed in U.S. Pat. No. 3,837,966 to Finke granted Sept. 24, 1974 and U.S. Pat. No. 3,798,106 to Jenkins et al granted Mar. 19, 1974.

Other prior art U.S. patents of general interest are U.S. Pat. Nos. 35,335 to Van Auken dated May 20, 1862, No. 403,537 To Lafloe dated May 21, 1889, No. 1,162,700 to Lamoureau dated Nov. 30, 1915, No. 1,794,578 to Brock dated Mar. 3, 1931, No. 2,619,703 to Dungler dated Dec. 2, 1952, and No. 3,468,739 to Schrotz dated Sept. 23, 1969.

SUMMARY OF THE INVENTION

The invention resides in a hand-held apparatus for printing and applying pressure sensitive labels carried on a web of supporting material, having a frame with a handle. a platen and a cooperable print head, a delaminator for delaminating printed labels from the web, an applicator roll for applying printed labels, means for advancing the web about the delaminating means to dispense a label into label applying relationship with respect to the applicator roll, an actuator disposed at the handle for moving the print head into cooperation with the platen and for moving the web advancing means, and mounting structure for the applicator roll mounts the applicator roll for both rotational and canting movement with respect to the frame so that the applicator roll will accommodate the surface to which the label is to be applied. The invention also relates to method of applying labels with a hand-held labeler having a frame with a handle, comprising the steps of providng the labeler with an applicator roll which can rotate and cant relative to the frame, grasping the handle, and moving the labeler to bring the applicator roll into contact with the surface to be labeled and to cant the applicator roll to accommodate the surface to be labeled as the applicator roll is rolled over the label.

DESCRIPTION OF THE PREFERRED EMBODIMENTS

Figure 1:
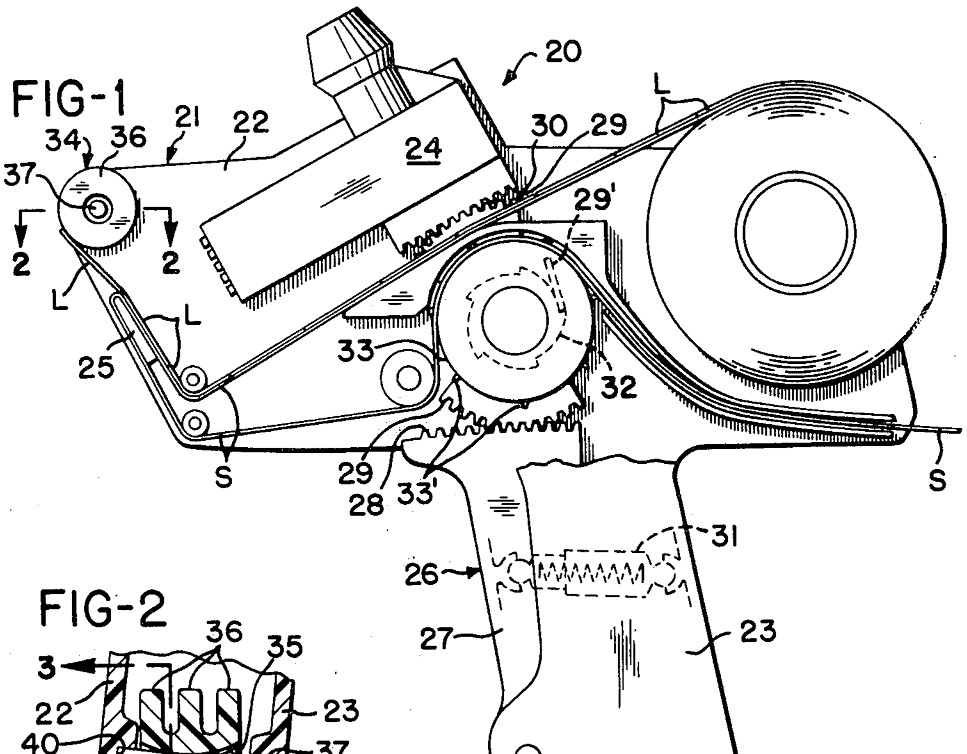
FIG. 1 is a side elevational diagrammatic view of a labeler having an applicator roll for carrying out the invention.

With reference to FIG. 1, there is shown a label printing and applying apparatus generally indicated at 20 substantially identical to the apparatus shown in FIGS. 1 and 3 through 27 and described in the specification of U.S. Pat. No. 3,798,106, except for the applicator roll. Reference may be made to the disclosure in U.S. Pat. No. 3,798,106 for additional constructional details, the disclosure of which is incorporated herein by reference.

The apparatus 20 has a housing or frame generally indicated at 21 including housing sections 22 and 23. The frame 21 suitably mounts a print head generally indicated at 24 for reciprocating movement into and out of printing cooperation with a label L carried on a web of supporting material S. One of the labels L is disposed between a print head 24 and a platen 25. An actuator generally indicated at 26 is shown to comprise a lever 27 pivotally mounted on a pivot 27'. The lever 27 carries a pair of gear segments 28 (only one of which is shown). The frame 21 mounts a pair of gears 29 (only one of which is shown) in mesh with the respective gear segments 28. The print head 24 carries a pair of gear sections 30 (only one of which is shown) in mesh with respective gears 29. When the lever 27 is pivoted clockwise as viewed in FIG. 1, the gear segments 28 rotate the gears 29 counterclockwise and the print head 24 is driven into printing cooperation with a label L and the platen 25. Upon release of the lever 27, a return spring assembly 31 drives the lever 27 counterclockwise, thereby causing the gears 29 to rotate clockwise to drive the print head 24 to the initial position shown in FIG. 1. Mounted coaxially with the gears 29 is a feed wheel 33 having a plurality of radially spaced-apart teeth 33' for engaging and driving the supporting material web S. During return of the print head 24 to its initial position, one of the gears 24 causes a pawl 29' to drive a ratchet wheel 32 to in turn drive the feed wheel 33 so that the just printed label L is advanced into label applying relationship to an applicator roll 34 and an unprinted label L is advanced to the printing position between print head 24 and the platen 25.

Figure 2:
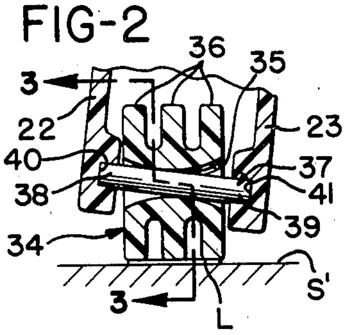
FIG. 2 is a sectional view taken along line 2—2 of FIG. 1 but showing the labeler and its applicator roll in label applying relatoinship to a label and a surface to be labeled.
Figure 3:
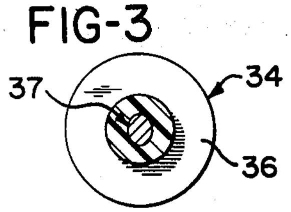
FIG. 3 is a sectional view taken along line 3—3 of FIG. 2.

With reference to FIGS. 2 and 3, the applicator roll 34 is shown to have a central through-hole 35 with a generally hour-glass configuration. In the illustrated embodiment, the roll 24 is shown to have spaced annular fins or flanges 36, but the invention in this and in the other embodiment is applicable as well to applicator rolls without such fins or flanges. An axle or shaft 37 extends through the through-hole 35 and end portions 38 and 39 of the axle 37 are received in respective circular holes or sockets 40 and 41. The axle 27 is shown to be circular cylindrical. When applying a label L using a hand-held labeler, it is usual for the user to hold the labeler so that the applicator roll 34 is slightly canted with respect to the surface S' to which the label L is to be applied as shown in FIG. 2. But for the resilience of the material, a conventional applicator roll would make only point contact with the label L as it rolls the label L onto the surface of the merchandise. While it is known to use very mushy elastomeric materials for applicator rolls it is preferred to use solid, not mushy, elastomers because they have less tendency to smear the ink on the just printed label. According to the present invention the applicator roll 34 can roll and can cant to accommodate the surface S' as best shown in FIG. 2. In this way the entire lateral surface of the roll 34 will contact the label L along a lateral line as shown to cause pressure to be applied across the width of the label L as the labeler 20 is moved relative to the label L and the surface S'.

Figure 4:
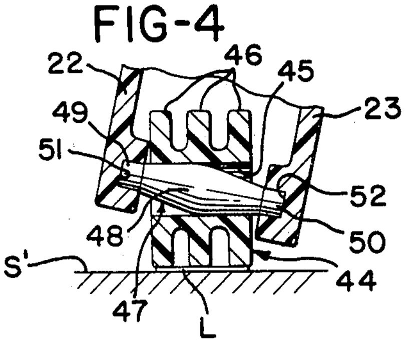
FIG. 4 is a sectional view similar to FIG. 2, but showing an alternative embodiment of the invention.

In the embodiment of FIG. 4, an applicator roll 44 has a round through-hole 45 and annular fins or flanges 46. Axle or shaft generally indicated at 47 has a generally bulbous configuration with a bulbous portion 48 disposed between circular cylindrical end portions 49 and 50. The end portions 49 and 50 are received in respective circular holes or sockets 51 and 52. The embodiment of FIG. 4 works the same as the embodiment of FIGS. 1 through 3. In the embodiment of FIGS. 1 through 3 and in the embodiment of FIG. 4, it is intended that the respective rolls 34 and 44 rotate relative to their respective axles 37 and 47. The rolls 34 and 44 and their respective shafts can however be keyed together so that they can cant relative to each other but rotate as a unit. In this event, the respective axles would rotate in their respective sockets 40 and 41, and 51 and 52.

Figure 5:
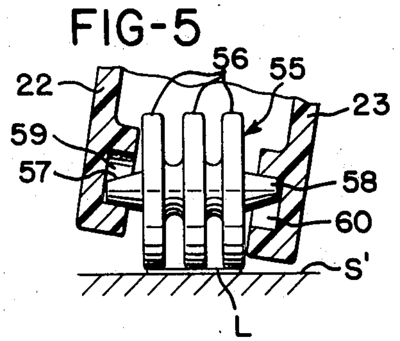
FIG. 5 is a sectional view similar to FIG. 2, but showing another alternative embodiment of the invention.

With reference to FIG. 5, applicator roll 55 has spaced annular fins or flanges 56. The roll 55 has integral stub or shaft ends 57 and 58 received in respective circular holes or sockets 59 and 60. The stub ends 57 and 58 are shown to be truncated cone-shaped. The holes 59 and 60 are shown to be larger in diameter than respective shaft ends 59 and 60 to provide a loose fit so that the applicator roll 55 can cant as well as roll as the label L is being applied.

Figure 6:
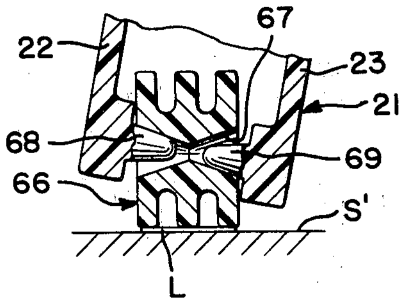
FIG. 6 is a sectional view similar to FIG. 2, but showing still another alternative embodiment of the invention.

With respect to FIG. 6, there is shown an applicator roll 66 having recess means shown to be a through-hole 67. It need not, however, be a through-hole because the recess means can be two oppositely facing, outwardly opening, blind holes if desired. The hole 67 has a generally tapering, hour-glass configuration. The sections 22 and 23 of the frame 21 carry generally aligned stub shafts or shaft ends 68 and 69 which are shown to have a generally truncated cone-shaped configuration. The ends of the stub shafts 68 and 69 are shown to be spaced apart. The hole 67 is larger than the stub shafts 68 and 69 so that there is a loose fit therebetween as shown. The applicator roll 66 can cant relative to the frame 21 as the applicator roll 66 rolls across the label L on the surface S'.

In the various embodiments, the applicator rolls 34, 44, 55 and 66 are preferably of one-piece molded elastomeric material. The rotating surfaces can be coated with a suitable lubricant. These rolls are all spaced from the frame sections 22 and 23 so there is adequate clearance for them to cant. Thus, the various sockets are spaced apart by a greater distance than the width of the respective roll.

By way of example, not limitation, the rolls 34, 44, 55 and 66 are preferably composed of a solid elastomeric material, that is, not a mushy material, and it is most preferable that the material have a durometer hardness between about 70 Shore A and about 65 Shore D.

Other embodiments and modifications of this invention will suggest themselves to those skilled in the art, and all such of these as come within the spirit of this invention are included within its scope as best defined by the appended claims.

I claim:

1. Hand-held apparatus for printing and applying pressure sensitive labels carried on a web of supporting material, comprising: a frame having a handle, a platen and a cooperable print head mounted by the frame, means for delaminating printed labels from the web, a rotatable applicator roll for applying printed labels, means for advancing the web about the delaminating means to dispense a label into label applying relationship with respect to the applicator roll, an actuator disposed at the handle for moving the print head into cooperation with the platen and for moving the web advancing means, the applicator roll having stub ends, the frame having spaced apart sockets, wherein each stub end is received in a respective socket, the sockets being oversize relative to the respective stub ends to provide a loose fit so that the applicator roll will cant and accommodate the surface to which the label is to be applied.

2. Hand-held apparatus as defined in claim 1, wherein the sockets are generally aligned, and wherein the sockets are spaced apart by a greater distance than the width of the roll to provide clearance for the roll to cant.

3. Hand-held apparatus as defined in claim 1, wherein the roll is relatively solid and has a durometer hardness between about 70 Shore A and about 65 Shore D.

4. Hand-held apparatus for printing and applying pressure sensitive labels carried on a web of supporting material, comprising: a frame having a handle, a platen and a cooperable print head mounted by the frame, means for delaminating printed labels from the web, a rotatable applicator roll for applying printed labels, means for advancing the web about the delaminating means to dispense a label into label applying relationship with respect to the applicator roll, an actuator disposed at the handle for moving the print head into cooperation with the platen and for moving the web advancing means, including opposed stub shafts carried by the frame, the applicator roll having recess means for receiving the stub ends, the recess means being oversize relative to the respective stub ends to provide a loose fit so that the applicator roll can cant and accommodate the surface to which the label is to be applied.

5. Hand-held apparatus as defined in claim 4, wherein the applicator roll is of one-piece construction and is of elastomeric composition.

6. Hand-held apparatus as defined in claim 4, wherein the recess means comprises a through-hole with a generally hour-glass configuration.

7. Hand-held apparatus as defined in claim 4, wherein the stub ends have generally conical surfaces.

8. Hand-held apparatus as defined in claim 4, wherein the recess means comprises a through-hole with a generally hour-glass configuration, and wherein the stub ends have generally conical surfaces.

9. Hand-held apparatus as defined in claim 4, wherein the applicator roll is of one-piece construction and is of relatively solid elastomeric composition, and wherein the stub ends have generally conical surfaces.

10. Hand-held apparatus as defined in claim 4, wherein the applicator is relatively solid and has a durometer hardness between about 70 Shore A and about 65 Shore D.

11. Hand-held apparatus for printing and applying pressure sensitive labels carried on a web of supporting material, comprising: a frame having a handle, a platen and a cooperable print head mounted by the frame, means for delaminating printed labels from the web, an applicator roll for applying printed labels, wherein the applicator roll is of one-piece construction and is of elastomeric composition, means for advancing the web about the delaminating means to dispense a label into label applying relationship with respect to the applicator roll, an actuator disposed at the handle for moving the print head into cooperation with the platen and for moving the web advancing means, the roll having a through-hole, and a generally circular cylindrical axle received in the through-hole, the inner surface of the through-hole being contoured relative to the axle to enable the applicator roll to cant relative to the axle so that the applicator roll will accommodate the surface to which the label is to be applied, the inner surface of the through-hole having a generally hour-glass shape.

12. Hand-held apparatus as defined in claim 11, wherein the frame has spaced apart aligned holes and the end portions of the axle are received in the holes.

13. Hand-held apparatus as defined in claim 11, wherein the roll is relatively solid and has a durometer hardness between about 70 Shore A and about 65 Shore D.

14. Hand-held apparatus for printing and applying pressure sensitive labels carried on a web of supporting material, comprising: a frame having a handle, a platen and a cooperable print head mounted by the frame, means for delaminating printed labels from the web, an applicator roll for applying printed labels, wherein the applicator roll is of one-piece construction and is of elastomeric composition, means for advancing the web about the delaminating means to dispense a label into label applying relationship with respect to the applicator roll, and an actuator disposed at the handle for moving the print head into cooperation with the platen and for moving the web advancing means, the roll having a through-hole, and an axle received in the through-hole, the inner surface of the through-hole and the outer surface of the axle being contoured relative to each other to enable the applicator roll to cant relative to the axle so that the applicator roll will accommodate the surface to which the label is to be applied, wherein the axle has a generally bulbous portion received in the through-hole.

15. Hand-held apparatus as defined in claim 14, wherein the frame has spaced apart generally aligned holes, wherein the end portions of the axle are received in the holes.

16. Hand-held apparatus as defined in claim 14, wherein the roll is relatively solid and has a durometer hardness between about 70 Shore A and about 65 Shore D.

17. Hand-held apparatus as defined in claim 14, wherein the through-hole is generally round.

* * * * *